(12) United States Patent
Johnston (10) Patent No.: US 10,415,375 B2
(45) Date of Patent: Sep. 17, 2019

(54) OPTICAL FIBER DISTRIBUTED SENSORS WITH IMPROVED DYNAMIC RANGE

(71) Applicant: William Johnston, Blacksburg, VA (US)

(72) Inventor: William Johnston, Blacksburg, VA (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/974,281

(22) Filed: May 8, 2018

(65) Prior Publication Data

US 2018/0252098 A1 Sep. 6, 2018

Related U.S. Application Data

(62) Division of application No. 14/592,608, filed on Jan. 8, 2015, now Pat. No. 9,982,531.

(51) Int. Cl.
*E21B 47/12* (2012.01)
*G01V 1/40* (2006.01)
(Continued)

(52) U.S. Cl.
CPC ............ *E21B 47/123* (2013.01); *E21B 47/14* (2013.01); *G01V 1/226* (2013.01); *G02B 6/022* (2013.01); *G01V 1/40* (2013.01)

(58) Field of Classification Search
None
See application file for complete search history.

(56) References Cited

U.S. PATENT DOCUMENTS

| | | | | |
|---|---|---|---|---|
| 2,595,241 A | * | 5/1952 | Goble | E21B 47/082 |
| | | | | 166/250.01 |
| 2,933,144 A | * | 4/1960 | Scott | E21B 47/14 |
| | | | | 173/1 |

(Continued)

FOREIGN PATENT DOCUMENTS

JP 2001507446 A 6/2001

OTHER PUBLICATIONS

Notification of Transmittal of the International Search Report and the Written Opinion of the International Searching Authority, or the Declaration; PCT/US2015/011321; dated Apr. 22, 2015, 12 pages.

(Continued)

*Primary Examiner* — Jill E Culler
(74) *Attorney, Agent, or Firm* — Cantor Colburn LLP (57) ABSTRACT

An apparatus for sensing acoustic waves below a surface of the earth includes an optical fiber disposed below the surface of the earth and having a series of sensing units along the optical fiber with each sensing unit having three or more reflectors and an optical interrogator in optical communication with the optical fiber. The reflectors in each sensing unit are positioned to provide a linearized response that approximates a sawtooth wave better than a sinusoidal wave to sense the acoustic waves in a desired dynamic range. The optical interrogator is configured to transmit an input light signal into the optical fiber and receive a reflected light signal from the optical fiber due to the input light signal in order to measure a strain on each sensing unit due to interaction with the acoustic waves and to determine a location of the sensing unit corresponding to the sensed strain.

8 Claims, 9 Drawing Sheets

(51) Int. Cl.
*G01V 1/22* (2006.01)
*G02B 6/02* (2006.01)
*E21B 47/14* (2006.01)

(56) References Cited

U.S. PATENT DOCUMENTS

| | | | | |
|---|---|---|---|---|
| 4,761,073 | A * | 8/1988 | Meltz | G01B 11/16 250/227.18 |
| 5,144,690 | A * | 9/1992 | Domash | G01D 5/35383 385/12 |
| 5,502,782 | A * | 3/1996 | Smith | G02B 6/02071 385/1 |
| 6,335,524 | B1 * | 1/2002 | Udd | G01D 5/35383 250/227.14 |
| 6,839,131 | B2 * | 1/2005 | Kwon | H04B 10/07955 356/73.1 |
| 6,913,079 | B2 * | 7/2005 | Tubel | E21B 47/00 114/382 |
| 7,046,866 | B2 * | 5/2006 | Sahlgren | G02B 6/02133 385/10 |
| 7,224,465 | B2 * | 5/2007 | Balachandran | G01D 5/35303 356/480 |
| 7,428,054 | B2 * | 9/2008 | Yu | G01D 5/35303 356/480 |
| 2003/0127232 | A1 * | 7/2003 | Bussear | E21B 34/14 166/373 |
| 2004/0067003 | A1 * | 4/2004 | Chliaguine | G01D 5/35303 385/13 |
| 2010/0207019 | A1 * | 8/2010 | Hartog | E21B 47/101 250/269.1 |
| 2011/0110621 | A1 * | 5/2011 | Duncan | E21B 47/06 385/13 |
| 2013/0021615 | A1 * | 1/2013 | Duncan | G01H 9/004 356/477 |
| 2015/0233236 | A1 | 8/2015 | Johnston | |

OTHER PUBLICATIONS

Wada, et al.; "Enhancement of Dynamic Range of Optical Fiber Sensor Using Fiber Bragg Grating Fabry-Perot Interferometer with Pulse-Position Modulation Scheme: Compensation of Source Wavelength-Sweep Nonlinearity"; Aug. 2013; 9 pages.

* cited by examiner

OPTICAL FIBER DISTRIBUTED SENSORS WITH IMPROVED DYNAMIC RANGE

CROSS REFERENCE TO RELATED APPLICATIONS

This application is a divisional application of U.S. application Ser. No. 14/592,608 filed Jan. 8, 2015, the disclosure of which is incorporated by reference herein in its entirety.

BACKGROUND

Boreholes are typically drilled into the earth to explore for and extract hydrocarbons. Once a reservoir of hydrocarbons is discovered, borehole completion activities are required before the hydrocarbons can be extracted.

Some borehole completion activities include disposing completion equipment, material or structures into a borehole. For example, the borehole may be lined with a casing that is then cemented in place. In another example, acid may be disposed in the casing in order to open up any obstructions in perforations in the casing to allow the flow of hydrocarbons. Many of these downhole completion activities need to be monitored by a completion specialist at the surface of the earth in order to ensure that an activity is working or has been completed correctly.

Monitoring of completion activities may be accomplished using sensors disposed downhole that provide data to the completion specialist at the surface. The sensors are generally configured to sense a parameter associated with a completion activity. If an activity being sensed is associated with a wide dynamic range, then sensors having a corresponding wide dynamic range will provide more accurate sensing data than data that would be provided by sensors having a narrower dynamic range.

BRIEF SUMMARY

Disclosed is an apparatus for sensing acoustic waves below a surface of the earth. The apparatus includes an optical fiber disposed below the surface of the earth, the optical fiber having a series of sensing units along the optical fiber, each sensing unit having three or more reflectors. The reflectors in each sensing unit are positioned to provide a linearized response that approximates a sawtooth wave better than a sinusoidal wave to sense the acoustic waves in a desired dynamic range. The apparatus further includes an optical interrogator in optical communication with the optical fiber and configured to transmit an input light signal into the optical fiber and receive a reflected light signal from the optical fiber due to the input light signal in order to measure a strain on each sensing unit due to interaction with the acoustic waves and to determine a location of the sensing unit corresponding to the sensed strain.

Also disclosed is a method for sensing acoustic waves below a surface of the earth. The method includes: disposing an optical fiber below the surface of the earth, the optical fiber having a series of sensing units along the optical fiber, each sensing unit having three or more reflectors; transmitting an input light signal into the optical fiber using an optical interrogator; and receiving a reflected light signal from the optical fiber due to the transmitting using the optical interrogator to measure a strain on each sensing unit due to interaction with the acoustic waves and to determine a location of the sensing unit corresponding to the sensed strain; wherein the reflectors in each sensing unit are positioned to provide a linearized response that approximates a sawtooth wave better than a sinusoidal wave to sense the acoustic waves in a desired dynamic range.

Further disclosed is a method for fabricating distributed acoustic sensors for sensing acoustic waves below the surface of the earth using an optical fiber having a series of sensing units. The method includes: determining a range of strain between a peak and a valley in an oscillatory strain response in an optical fiber; calculating a first spacing from a first reflector in the optical fiber to a second reflector in the optical fiber that encompasses the determined range; calculating a second spacing from the second reflector to a third reflector in the optical fiber, wherein the first spacing and the second spacing are in accordance with an initial two consecutive terms of an expansion that represents an approximation of a sawtooth wave; and writing the first reflector, the second reflector at the first spacing, and the third reflector at the second spacing into the optical fiber for each of the sensing units using a reflector writer to produce the distributed acoustic sensors.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are apparatus and method for sensing a parameter of interest downhole having a wide dynamic range. Sensing involves using an optical fiber that has a linearized response over a wide selected range that provides an improved dynamic range compared to prior art optical sensors. Specifically, a number of reflectors and their locations are determined so as to provide the wide linearized dynamic range. In one or more embodiments, the wide linearized dynamic range enables each sensor location in an optical fiber to sense acoustic vibrations and act as a microphone, geophone or hydrophone.

Figure 1:
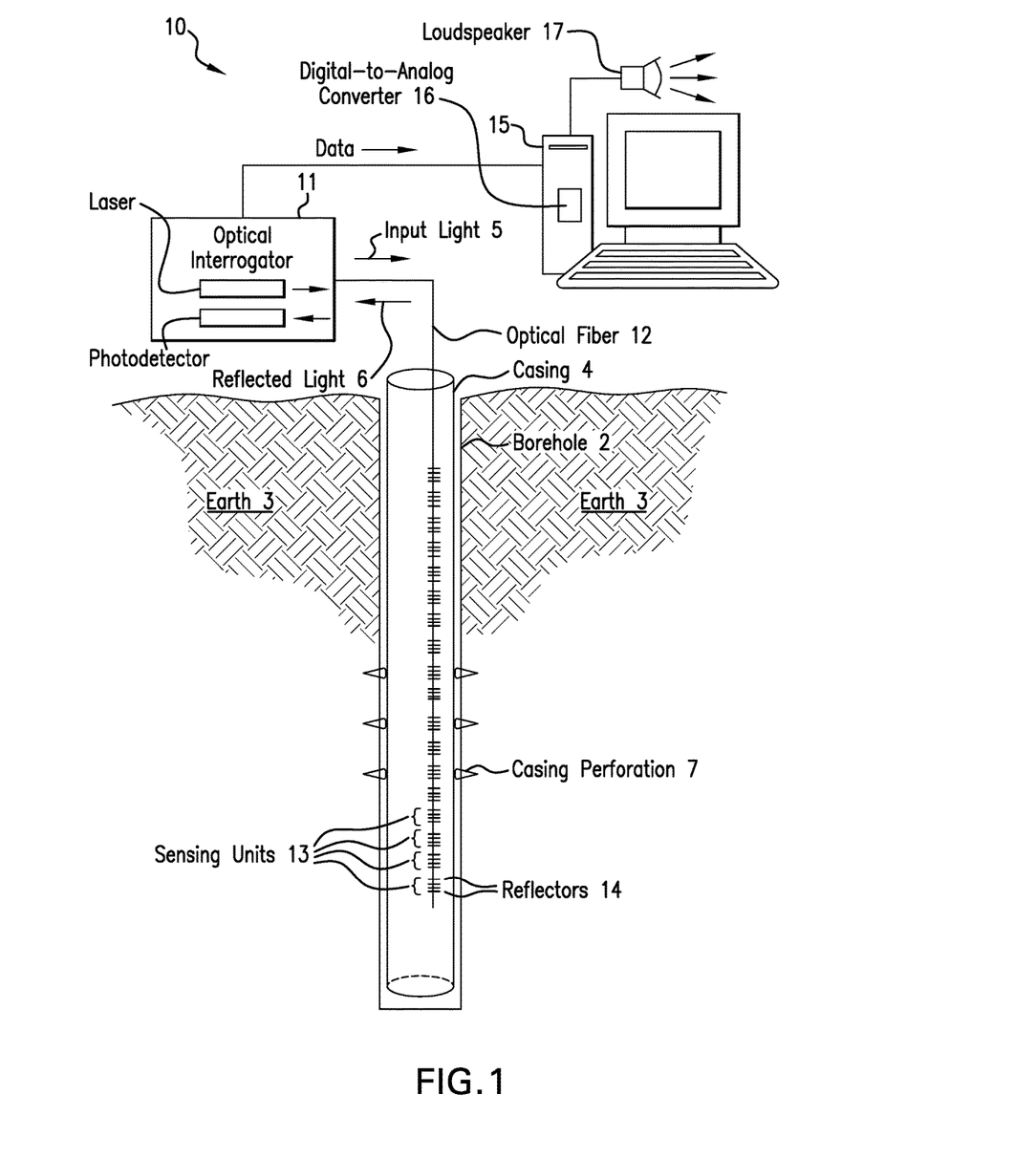
FIG. 1 illustrates a cross-sectional view of an exemplary embodiment of optical fiber distributed sensors disposed in a borehole penetrating the earth.
Figure 2:
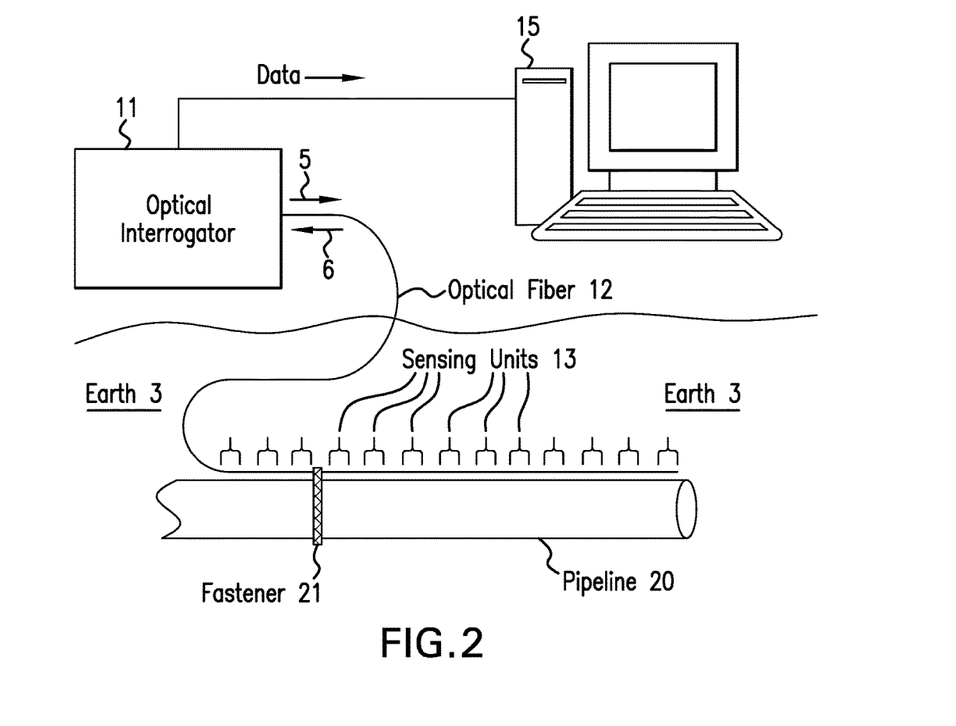
FIG. 2 depicts aspects of the optical fiber distributed sensors secured to an underground pipeline.

Referring now to FIG. 1, a simplified schematic diagram of an optical sensing system 10 is illustrated. The optical system 10 includes an optical interrogator 11 in optical communication with an optical fiber 12 that has a series of sensing units 13 spaced from each other along the optical fiber 12. The optical fiber 12 is shown affixed to a casing 4 that lines a borehole 2 penetrating the earth 3. The casing 4 may have one or more perforations 7 to allow hydrocarbons to flow into the casing for production purposes. In another embodiment illustrated in FIG. 2, the optical fiber 12 is secured to an underground pipeline 20 by a fastener 21. Non-limiting embodiments of the fastener 21 include a pipe clamp 22 that circumferentially surrounds the pipeline 20 or an adhesive (not shown). Alternatively, the optical fiber 12 may be laid unsecured adjacent to the pipeline 20 such that it contacts the pipeline or is close enough to the pipeline to hear leaking sounds of an anticipated amplitude (e.g., within one foot). By being close to or contacting the pipeline 20, the optical sensing system can be used to listen for leaks from the pipeline 20.

The optical interrogator 11 is configured to interrogate each sensing unit 13 to obtain a measured value and associate the measured value with a location of the corresponding sensing unit 13 along the optical fiber 12. In general, the interrogation is performed by transmitted light input light 5 into the optical fiber 12 using a light source (not shown) and to receive reflected light 6 to generate an interference pattern that is detected by a light detector (not shown). In one or more embodiments, the optical interrogator may be based on Optical Time Domain Reflectometry (OTDR) or Optical Frequency Domain Reflectometry (OFDR) as is known in the art. Other known reflectometry methods may also be used. A computer processing system 15 is in communication with the optical interrogator 11 to record measured values of sensing units and to determine corresponding locations along the optical fiber, further process data from the optical interrogation, and/or perform other computational functions related with this disclosure. The computer processing system 15 may be configured to display recorded data or to display received data in real time to a user using a display. In one or more embodiments, the data is displayed as a "waterfall" display with depth (or distance along the optical fiber) on one axis, time on another axis, and various colors or shades of color to represent measured intensity of strain. In one or more embodiments, the computer processing system 15 includes a digital-to-analog converter 16 configured for converting a digital signal as may be produced by the optical interrogator 11 or the processing system into an analog signal. The analog signal can be transmitted to a loudspeaker 17 for playing sounds that may be received by the sensing units when these sensing units are configured to have a response range that allow the sensing units to act as microphones. In this manner, a user can listen to sounds downhole such as may be produced by a flowing liquid. In one example, the flow of liquid into the borehole and casing may be listened to for monitoring purposes.

Each sensing unit 13 along the optical fiber 12 includes a plurality of reflectors 14 that are configured to reflect the input light 5. Each sensing unit 13 has a "normal" or reference spacing of the associated reflectors 14. As each sensing unit is exposed to an acoustic signal or waves, the reflectors 14 in each sensing unit 13 may experience a shift in spacing between the reflectors from the normal spacing based on a magnitude or intensity of the strain imparted to the optical fiber by the acoustic waves. The shift in spacing then results is a change in the interference pattern established in the optical interrogator 11, which is then correlated to a measured value. In that acoustic waves are being sensed, the optical sensing system 10 may be referred to as the Distributed Acoustic Sensing (DAS) system 10.

An overview of the DAS system 10 is now presented. A distributed acoustic sensor (DAS) interrogator (i.e., DAS box) in one or more embodiments is a special type of coherent optical time domain reflectometer (OTDR) that is used to measure vibrations. The DAS contains a highly coherent laser, meaning that the laser emits a narrow range of optical wavelengths, which is typically pulsed at frequencies in the 1 to 20 kHz range. Each time the laser is pulsed it emits a pulse of light which is 10s to 100s of nanoseconds long for example; this pulse width defines the length of fiber being interrogated at any one time. As the light propagates down the fiber a small amount of it undergoes Rayleigh scattering from imperfections within the fiber and some portion of this Rayleigh scattered light propagates back towards the DAS box (i.e., optical interrogator). Since the laser pulse is highly coherent and has a finite width, light from within different parts of the laser pulse may interfere with each other which can then be measured with suitable electronics, which may include a photodetector.

Since the signal detected by the DAS is an interference signal caused by the distribution of scattering imperfections within the fiber, anything that alters the optical path length will cause a change in the interference pattern. Things which can alter the optical path length include temperature due to the change in the refractive index with temperature, strain which changes the physical length of the fiber, and opto-elastic constants which characterize how the fiber's index of refraction varies with stress. For DAS, a primary concern is with measuring the acoustic strains on the fiber but any DAS will also have the potential to see signals due to the other two effects as well. Returning to the operation of the DAS box, after a single pulse is injected into the fiber the DAS measures the reflected signal as a function of time. The time delay between the launch of the pulse and the detection time is directly proportional to the distance from which the light scattered within the fiber. So each pulse provides a single strain measurement along the full length of the fiber. Each successive pulse allows the DAS box to measure variations in the strain as a function of time. Combining these two measurements provides a measurement of acoustic strains as a function of both time and position along a fiber.

Figure 3:
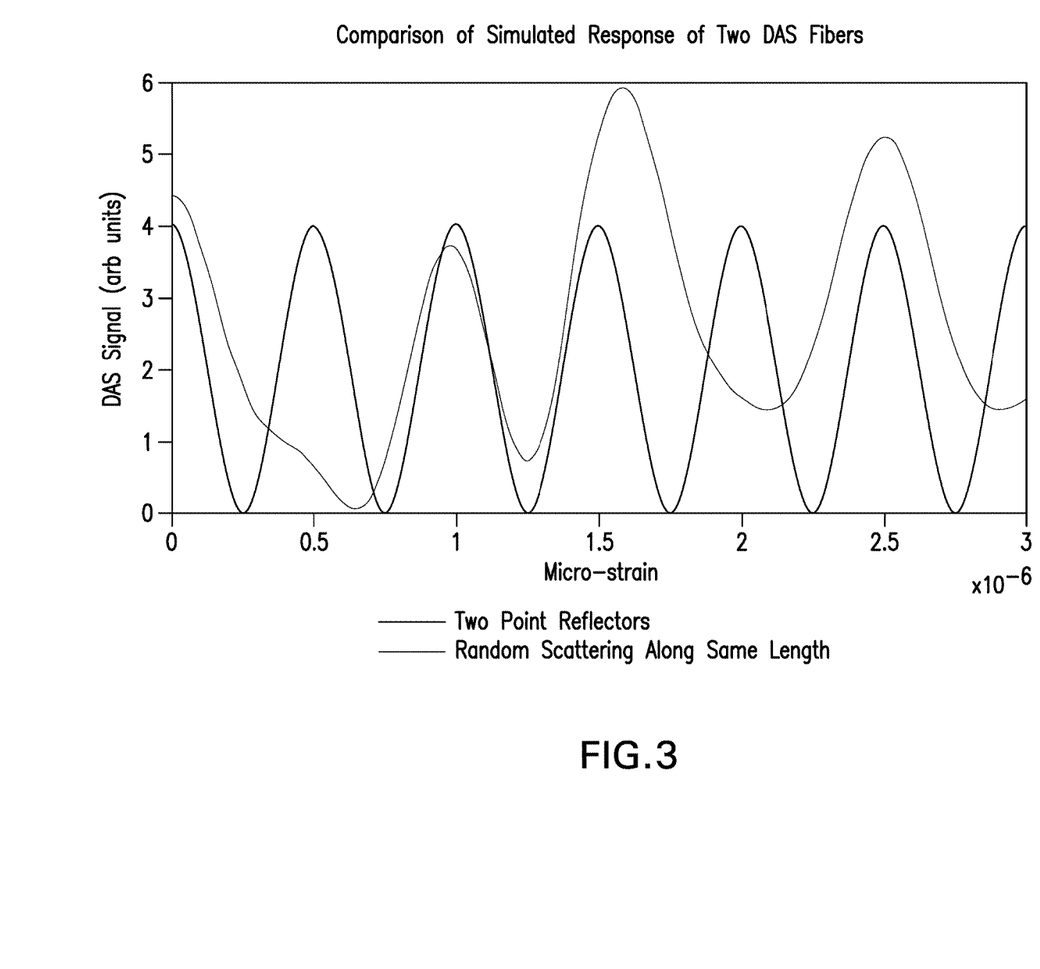
FIG. 3 depicts aspects of strain responses of prior art optical sensors.

If just one position on the fiber is considered and a slowly increasing strain applied to it, then the DAS signal sweep across several interference fringes would be seen as the strain increases. If the fiber contained just two point reflectors, it would form a Fabry-Perot cavity and the interference signal would be very sinusoidal as illustrated in FIG. 3. However, a standard single mode fiber contains a huge number of scattering sites, this does not produce a very sinusoidal signal and the fringe depth is highly variable making it difficult to extract information from the data in a simple manner. In FIG. 3, the strain response of two fibers hooked up to a prior art DAS system is illustrated. For two point reflectors, the prior art DAS system measures sinusoidal interference signals. For a length of randomly scattering fiber, the resulting signal contains oscillations but these oscillations are not regular and this makes understanding acoustic data from a DAS system difficult.

Figure 4:
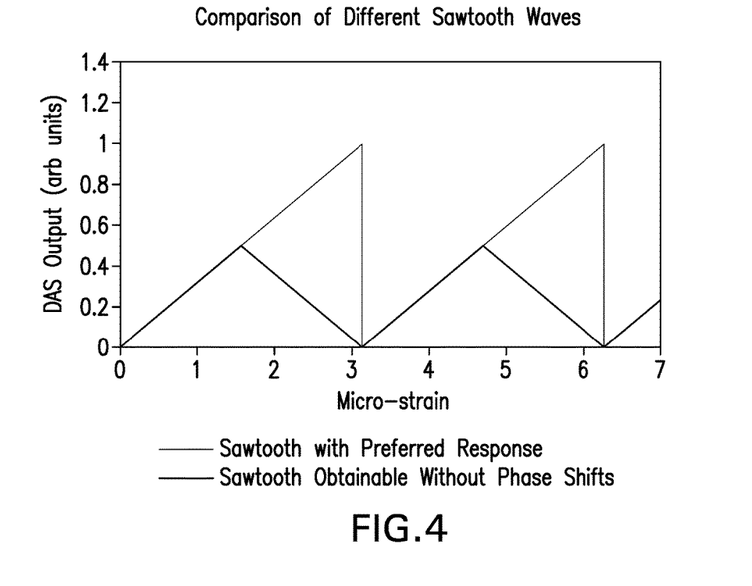
FIG. 4 depicts aspects of a desired strain response from an optical fiber sensor.
Figure 5:
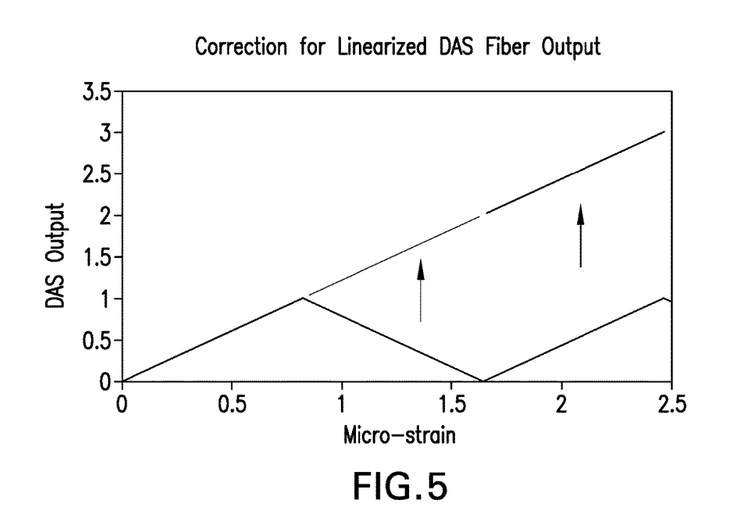
FIG. 5 depicts aspects of an example of how to unwrap a signal from an optical fiber with a sawtooth strain response.

As disclosed herein, the novel optical system 10 uses three or more reflectors in the fiber, or even a continuous distribution of scatter sites with reflectivity varying with position, to produce an improved strain response. Since any strain signal produced by the fiber will be oscillatory over some amount of strain, an immediately useful strain response is a sawtooth function as illustrated in FIG. 4. The sawtooth function provides linear response sections. FIG. 4 illustrates examples of two different sawtooth waves whose strain response would be preferable to the response of a fiber with random scattering. As part of the data analysis, the sharp peaks and valleys in the sawtooth strain response need to be located. Once these points are located, the sawtooth strain signal is unwrapped as illustrated in FIG. 5. Once this unwrapping is accomplished, there is a direct linear or linearized relationship between the DAS signal and the true acoustic strain present. Due to this linear relationship, a DAS with such a fiber behaves very much like a microphone, geophone, or hydrophone. As used herein, the term "linearized" relates to a response that is substantially linear meaning that the response is improved over a sinusoidal response over the same dynamic range. In one or more embodiments, at least a portion of the "linearized" response between inflection points (such as between the lower valley points and the upper peak points in a sawtooth curve) is linear.

As is shown in FIG. 3, two point reflectors produce a cosine strain response. The oscillation length of the strain response is a function of the distance between the reflectors, as the distance between the reflectors increases the oscillation length decreases. Now using three point reflectors (instead of two) at x1, x2, and x3. results in producing a combination of three cosine strain signals, one from scattering between points 1 and 2, one from points 1 and 3, and one more from points 2 and 3. Now if x1, x2, and x3 are chosen at suitable distances from each other and with suitable reflectivities the Fourier series approximation begins forming a sawtooth function. As the number of reflectors is increased, the approximation can be made increasingly better.

The mathematics behind using the Fourier series approximation is now discussed. If an optical fiber only contained two scattering sites within the fiber then it would produce a perfectly sinusoidal interference pattern as strain is applied to the fiber. The return signal may be represented as:

$$S = \sin\left[\frac{4\pi n L}{\lambda}(1 + \varepsilon(t))\right] \quad (1)$$

where n is the index of refraction of the fiber, L is the distance between the point reflectors, $\lambda$ is the laser wavelength, and $\varepsilon(t)$ is a time dependent strain. Once the terms inside the sine function reach a value of roughly $\pi/2$, the linearity of the signal is completely lost which makes it extremely difficult to measure $\varepsilon(t)$ accurately. For applications such as vertical seismic profiling (VSP) obtaining the correct $\varepsilon(t)$ is essential and is very difficult using a standard prior art single mode fiber.

In order to arrive at a fiber with more desirable strain sensing characteristics requires looking at how the interference signal actually arises. A coherent laser signal propagates down an optical fiber and scatters from a collection of scattering sites. The first scattering site occurs at x=0 so reflection from this site will be considered as having a phase of zero, $\psi = \exp(ikx) = \exp(0) = 1$. All other scattering sites will pick up a phase of $\exp(2ikx)$ where the extra factor of two arises because the light has to travel along the fiber twice due to the reflection. If the arbitrary amplitude A is assigned to each scatter site, then the sum of the reflected amplitudes from all of the scatter sites will be:

$$f = \sum_n A_n \exp 2ikx_n. \quad (2)$$

For the case of two scatter sites, this reduces to A1+A2*exp(2ikx) and if L=x is the distance between scatter sites and the scatter sites have equal amplitude then f=1+exp(2ikL) where the quantity k is:

$$k = \frac{2\pi n(1 + \varepsilon(t))}{\lambda}.$$

And, the physically observable signal is: S=f*f where * represents a complex conjugate. If this math is carried out further, then the case of a Fabry-Perot signal with sinusoidal interference fringes is obtained for two point scatter sites. Looking at equation (2) for f again and assuming that there are a large number of scatter sites, then it is recognized that this equation becomes a Fourier transform as follows:

$$f = \sum_n A_n \exp 2ikx_n \approx \int A(x) \exp(2ikx) dx. \quad (3)$$

It can now be seen that the physically measured DAS signal, S, is just the power spectrum obtained by transforming the locations and amplitudes of the reflector sites within the DAS optical fiber and the variable k is proportional to strain.

The reflectors 14 in each sensing unit 13 are now discussed. Rayleigh backscattering produces a signal on the order of −65 db/meter of fiber for example, however, the exact level of backscatter is highly sensitive to the wavelength of the laser in the optical interrogator. In general, Rayleigh scattering intensity follows a $1/(\text{wavelength})^4$ relationship, so even a small change in wavelength of the input light wavelength results in large change in scattering amplitude. Adding even weak reflectors into a fiber can significantly increase the signal to noise ratio of a DAS system while also improving its linearity. The disclosure herein is primarily concerned with point reflectors which can be made by splicing together fibers or writing a sudden index of refraction change into the fiber with high power UV light. A reflector written into the fiber in this manner can have reflectivity on the order of −50 dB so that the Rayleigh scatter signal would become insignificant in comparison. Splicing fibers together can result in very large reflectivity depending on how much the cores of the two fibers are offset from each other. A nice feature of both of these types of reflectors is that the reflectivity would not be greatly wavelength or temperature dependent.

Fiber Bragg Gratings (FBG) can have a large range of reflectivity from invisible up to complete reflection at a single wavelength. Bragg gratings can be designed to reflect at a single wavelength or 'chirped' to reflect over a range of wavelengths. Bragg gratings can be manufactured which will produce phase shifts upon reflection which can be very desirable for the DAS system 10 as it makes composing a Fourier series involving both sine and cosine terms possible, point reflectors only permit Fourier series composed of cosine terms.

Figure 6:
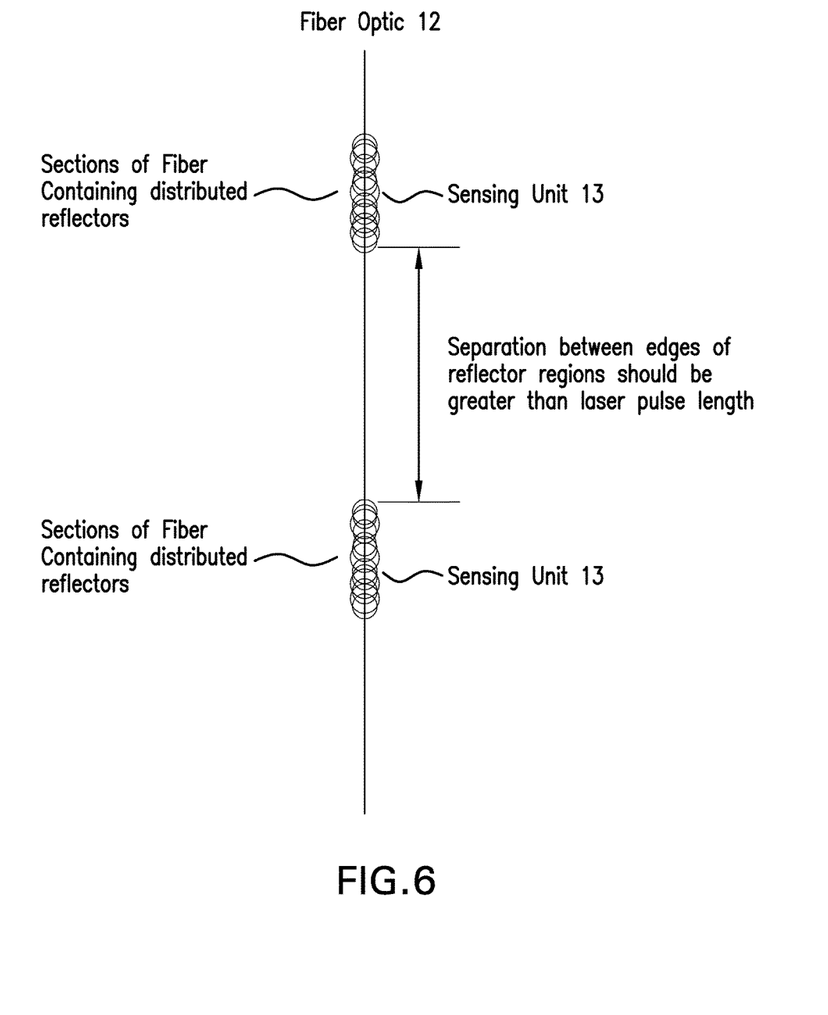
FIG. 6 depicts aspects of separation sections of optical fiber that have linearized responses.

The distribution of the sensing units 13 is now discussed. For distributed acoustic measurements, it is desirable to have a large number of linearized sections within the optical fiber. The separation between groups of reflectors is generally greater than the pulse width of the laser as diagrammed in FIG. 6. In a fiber to be deployed downhole, there may be hundreds or thousands of linearized fiber sections (i.e., sensing units) in one or more embodiments.

Next, one example of a method for designing a set of reflectors is discussed. The first step is to determine the range of strain between the peak and valley in the strain response. In principle, having a greater strain range between peaks and valleys makes the data processing easier but it also reduces the sensitivity of the system since the slope of the DAS signal is lower. The range of desired linearized measured strains establishes the spacing between the two closest reflectors. The spacing between a peak and valley in terms of strain will be:

$$\Delta\varepsilon = \frac{\lambda}{4nL}$$

where $\lambda$ is the laser wavelength, n is the index of refraction of the fiber, and L is the distance between reflectors. This shows that a short spacing between reflectors gives a wider peak to valley distance.

In a second step, once the first two reflector locations are chosen, the third reflector site is located at 3L from the first reflector. With a reflector at this location, this will cause the path lengths between the three reflectors to be L, 2L, and 3L, which is is ideal for setting up the first three terms of a Fourier series expansion of a desirable strain response. In this example, the following expansion is used:

$$f(x) = |\sin(x)| = \frac{2}{\pi} - \frac{4}{\pi}\left(\frac{\cos(2x)}{1*3} + \frac{\cos(4x)}{3*5} + \frac{\cos(6x)}{5*7} + \dots\right)$$

where x is a real variable. It can be appreciated that other multiples of the distance L can be used in the Fourier series expansion such as L, 3L, 5L, etc.

An overall reflectivity (R) for all the reflectors together in a sensing unit is selected so that the reflected signal will be greater than a reflected signal due to Rayleigh scattering alone (so that Rayleigh scattering will not interfere), but small enough so that the input light signal can interrogate all of the sensing units in the optical fiber. It can be appreciated that R will be a function of the number of sensing units, the number of reflectors in each sensing unit, and the total length of the optical fiber. In one or more embodiments, R is generally small such as less than −20 db. Once the overall reflectivity, R, of the point reflectors is chosen, the reflectivity of the three reflectors will be:

$$R1 = \frac{1}{\sqrt{7R}}$$

$$R2 = \sqrt{\frac{7}{9R}}$$

$$R3 = \frac{1}{5}\frac{1}{\sqrt{7R}}.$$

These reflectivities have been derived by setting the Fourier series constants for each term equal to the product of the reflectivities of its corresponding pair of reflectors.

Figure 7:
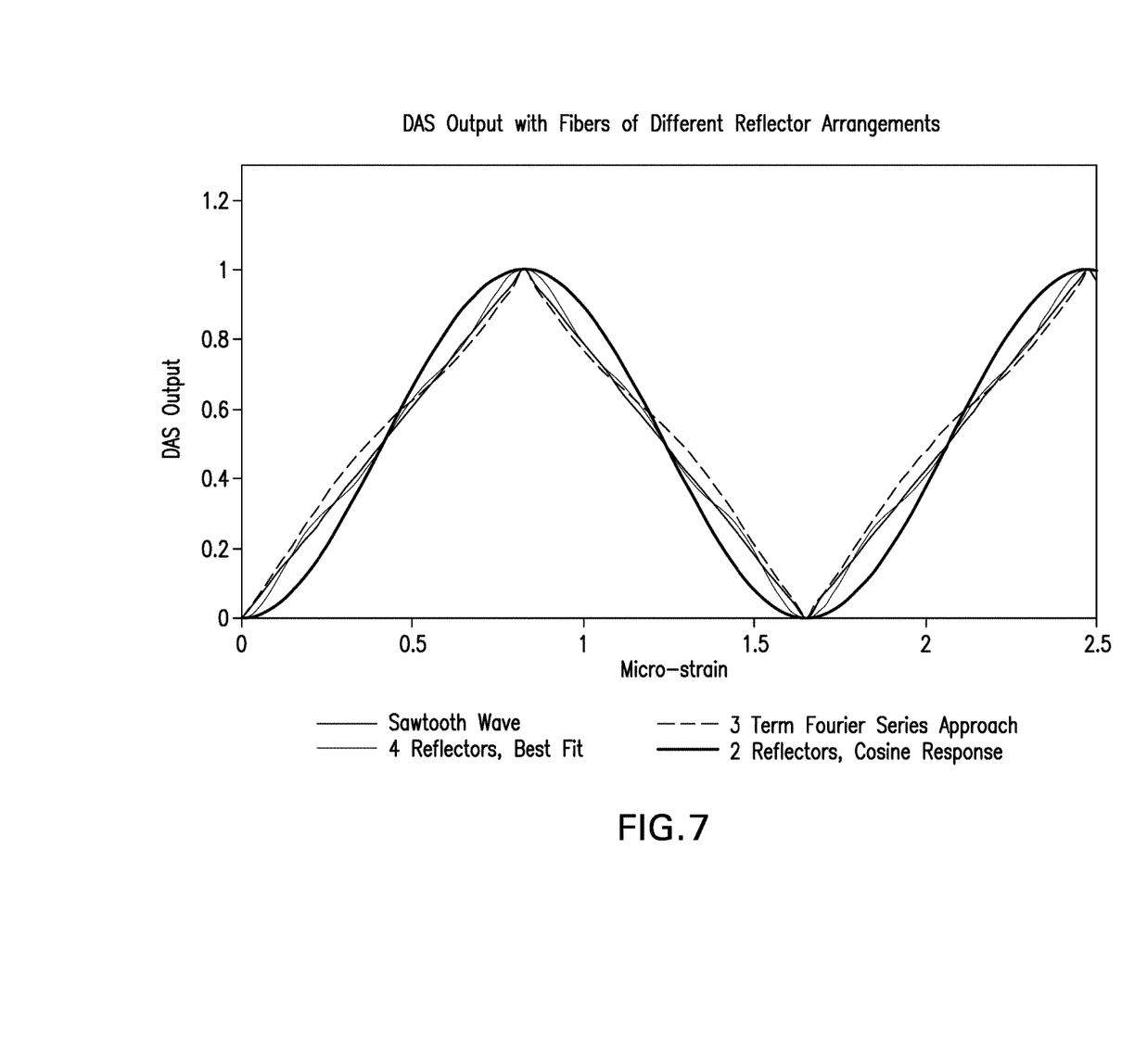
FIG. 7 depicts aspects of comparing three linearized responses to an ideal sawtooth wave.

In a third step, once the reflector spacing and reflectivity have been determined, the modulus squared of the Fourier transform is computed and then the inverse sine yields a sawtooth response function as illustrated in FIG. 7.

Another example of a method for designing a set of reflectors is discussed. In this example, more than three reflectors are used in a sensing unit 13. In a first step, the desired strain range between peaks and valleys is selected as in the method above for three reflectors. This determines the distance between the closest two reflectors. In a second step, the desired number of reflectors in each sensing unit is selected. It can be appreciated that the greater the number of reflectors in a sensing unit the response will approximate a sawtooth wave. In one or more embodiments, the number of reflectors in each sensing unit is at least three and in the range of three to ten although more than ten may be used. Having at least three reflectors provides a better sawtooth wave approximation than using two reflectors. In general, an increase in the number of reflectors provides an increase in the fit of the sawtooth approximation to the ideal sawtooth wave. Another consideration is the separation that is required between the sensing units to prevent the input light pulse from overlapping an adjacent sensing unit. In one or more embodiments, the length of the input light pulse is the range of 10 to 100 microseconds. In addition, manufacturing considerations may limit the number of reflectors in each sensing unit. In a third step, a Monte Carlo simulation is run that varies the locations of all but the first two reflectors and the reflectivity of all of the reflectors. A sum of the squares of the differences between the sawtooth wave and the simulated fiber is then taken to judge how well the fiber matches the desired response. This simulation is then run many times until an extremely good fit has been obtained. The desired fit may be determined when the simulated response is within a specified tolerance (e.g., 5%) about the desired ideal sawtooth pattern. The result from such a Monte Carlo simulation is illustrated in FIG. 7. FIG. 7 provides comparisons of an ideal sawtooth wave, a four reflector sensing unit chosen by Monte Carlo methods to fit the sawtooth function, a three reflector sensing unit that is based on a three term Fourier series expansion, and the sine response produced by just two reflectors in a sensing unit.

Figure 8:
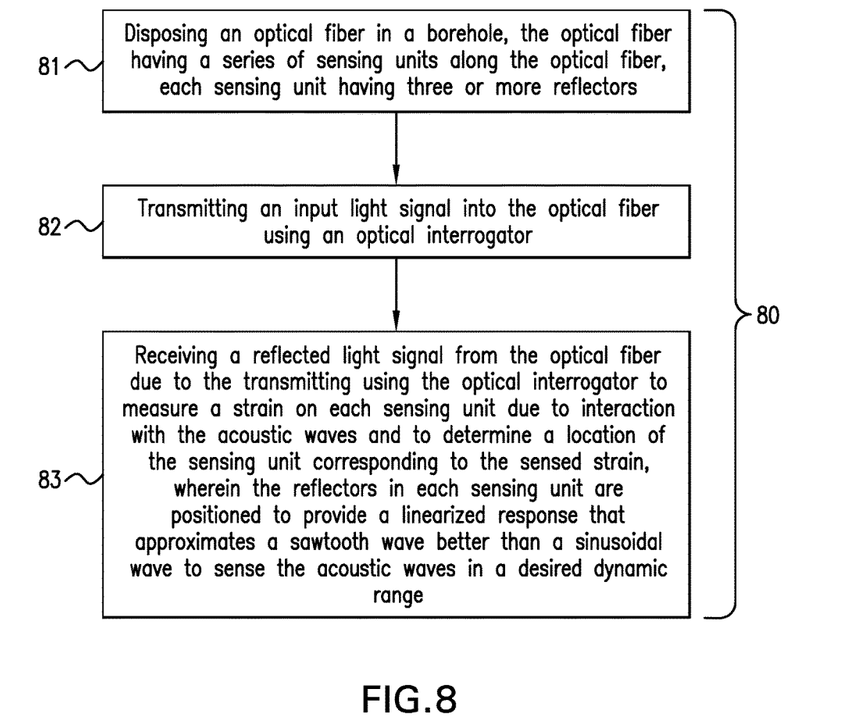
FIG. 8 is a flow chart of a method for sensing a parameter in the borehole.

FIG. 8 is a flow chart of a method 80 for sensing a parameter in the borehole. Block 81 calls for disposing an optical fiber in the borehole, the optical fiber comprising a series of sensing units along the optical fiber, each sensing unit comprising three or more reflectors. Block 82 calls for transmitting an input light signal into the optical fiber using an optical interrogator. Block 83 calls for receiving a reflected light signal from the optical fiber due to the transmitting using the optical interrogator to measure a strain on each sensing unit due to interaction with the acoustic waves and to determine a location of the sensing unit corresponding to the sensed strain, wherein the reflectors in each sensing unit are positioned to provide a linearized response that approximates a sawtooth wave better than a sinusoidal wave to sense the acoustic waves in a desired dynamic range. In one or more embodiments, the term "better" relates to the area between the sawtooth wave approximation and the ideal sawtooth wave being less than the area between a sinusoidal wave and the ideal sawtooth wave. Other metrics known in the art such as least squares of differences may also be used to show that the sawtooth wave approximation is closer to the ideal sawtooth wave than a sinusoidal wave. The method 80 may also include converting the sensed strains to electrical signals and transmitting the electrical signals to a speaker. The optical fiber in the method 80 may be secured to a structure disposed in the borehole and the method 80 may further include having the speaker broadcast sounds received by one or more sensing units that are selectable by a user. In one or more embodiments, acid is disposed in the borehole in order to clear an obstruction in a perforation in a casing lining the borehole and fluid flow sounds are received by one or more of the sensing units indicating success of the acid stimulation. In one or more embodiments, the optical fiber is disposed in a borehole penetrating an earth formation and the earth formation is being hydraulically fractured and the method 80 further includes monitoring results of the hydraulic fracturing by receiving fluid flow sounds from one or more of the sensing units.

Figure 9:
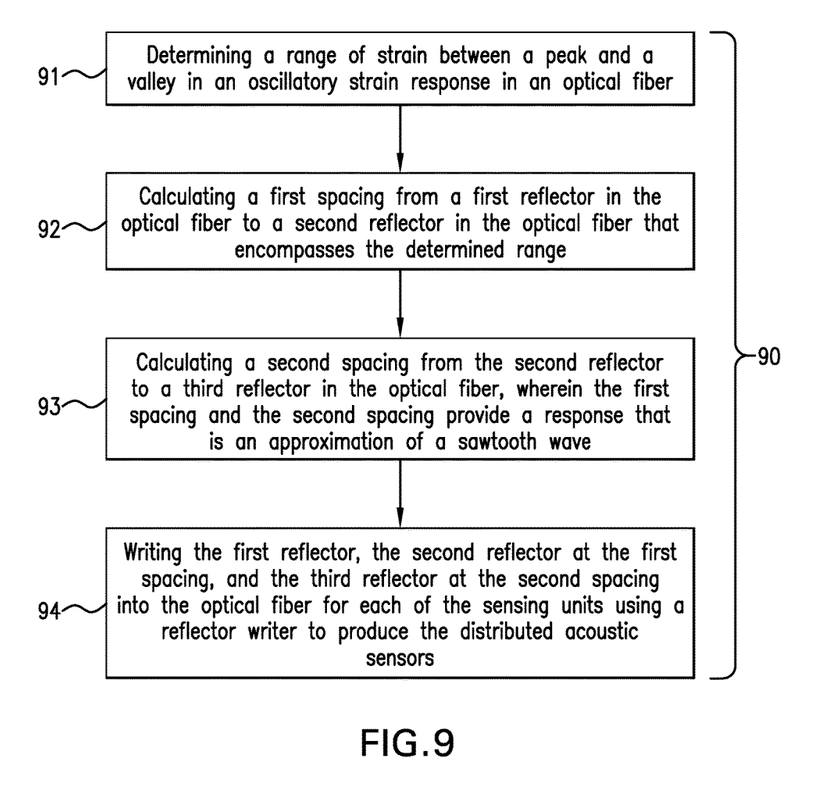
FIG. 9 is a flow chart of a method for fabricating distributed acoustic sensors for sensing acoustic waves in a borehole penetrating an earth formation using an optical fiber having a series of sensing units.

FIG. 9 is a flow chart of a method 90 for fabricating distributed acoustic sensors for sensing acoustic waves in a borehole penetrating an earth formation using an optical fiber having a series of sensing units. Block 91 calls for determining a range of strain between a peak and a valley in an oscillatory strain response in an optical fiber. Block 92 calls for calculating a first spacing from a first reflector in the optical fiber to a second reflector in the optical fiber that encompasses the determined range. Block 93 calls for calculating a second spacing from the second reflector to a third reflector in the optical fiber, wherein the first spacing and the second spacing provide a response that is an approximation of a sawtooth wave. In one or more embodiments, the first spacing and the second spacing are in accordance with an initial two consecutive terms of a Fourier series expansion representing a sawtooth wave. In one or more embodiments, the first spacing and the second spacing result from a Monte Carlo simulation that iterates until a fit based on a sum of the squares of differences meets or exceeds a threshold value. Block 94 calls for writing the first reflector, the second reflector at the first spacing, and the third reflector at the second spacing into the optical fiber for each of the sensing units using a reflector writer to produce the distributed acoustic sensors. In one or more embodiments, the first spacing equals L and the second spacing equals 2L. In one or more embodiments, the first spacing equals L and the second spacing equals 3L. The method 90 may also include calculating a spacing or distance from the first reflector for four or more additional reflectors, wherein the spacing or distance from the first reflector for four or more additional reflectors is in accordance with one or more terms in the Fourier series expansion that follow the initial two consecutive terms. In one or more embodiments, a total reflectance of all the reflectors is greater than the total reflectance due to Rayleigh scattering so that Rayleigh scattering does not affect measurements using the sensing units. It can be appreciated that after a certain number of reflectors in a sensing unit adding reflectors to that sensing unit does not significantly improve the linearity of the response. Hence, in one or more embodiments, the number of reflectors in a sensing unit is ten or fewer. In one or more embodiments, a distance between a reflector in a first sensing unit and a corresponding reflector in a second sensing unit adjacent to the first sensing unit is greater than a pulse width of light illuminating the optical fiber in order to prevent the pulse from overlapping adjacent sensing units.

Figure 10:
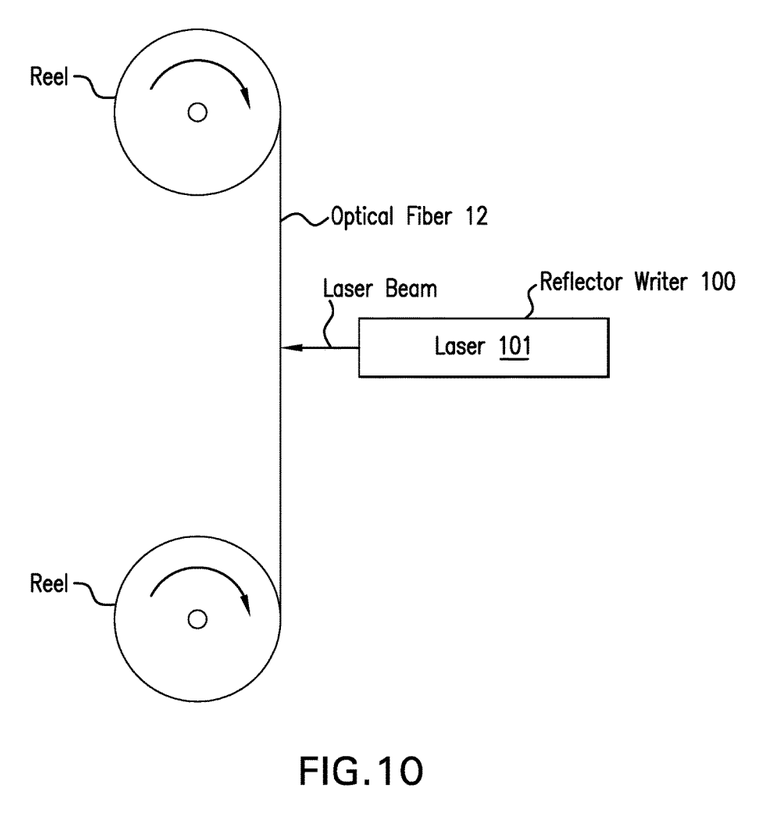
FIG. 10 depicts aspects of a reflector writer.

FIG. 10 depicts aspects of a reflector writer 100 configured for writing the reflectors 14 of a prescribed reflectance into the optical fiber 12. In one or more embodiments, the reflector writer 100 is a laser 101 that uses a laser beam to write reflectors in the optical fiber 12 as the optical fiber is drawn past the laser. It can be appreciated that a reflector may be a type of optical incongruity and, hence, the reflector writer may assume other configurations for providing optical incongruities such as by providing a splice. In one or more embodiments, the laser 101 is an ultraviolet laser that is focused on the optical fiber 12 to insert a defect state that modifies the index of refraction of the fiber at the point being written and, thus, the reflectivity of the reflector. The reflectivity of the reflector being written is generally a function of the power of the laser and the amount of time the laser beam is focused on the optical fiber among other factors. While the reflector is being written, the reflector reflectivity is being monitored such that when the desired reflectivity is reached the laser is turned off. The reflectivity may be monitored by knowing the intensity of an input light laser and measuring the intensity of the reflected light using a photodetector for example.

In support of the teachings herein, various analysis components may be used, including a digital and/or an analog system. For example, the optical interrogator 11 or the computer processing system 15 may include digital and/or analog systems. The system may have components such as a processor, storage media, memory, input, output, communications link (wired, wireless, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list or sequence of at least two terms is intended to mean any term or combination of terms. The terms "first," "second" and the like do not denote a particular order, but are used to distinguish different elements. The term "configured" relates to one or more structural limitations of a device that are required for the device to perform the function or operation for which the device is configured.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for fabricating distributed acoustic sensors for sensing acoustic waves below the surface of the earth using an optical fiber having a series of sensing units, the method comprising:
   determining a range of strain between a peak and a valley in an oscillatory strain response in an optical fiber;
   calculating a first spacing from a first reflector in the optical fiber to a second reflector in the optical fiber that encompasses the determined range;
   calculating a second spacing from the second reflector to a third reflector in the optical fiber, wherein the first spacing and the second spacing provide a response that is an approximation of a sawtooth wave; and
   writing the first reflector, the second reflector at the first spacing, and the third reflector at the second spacing into the optical fiber for each of the sensing units using a reflector writer to produce the distributed acoustic sensors, wherein the distributed acoustic sensors are sensitive to acoustic frequencies for sensing the acoustic waves.

2. The method according to claim 1, wherein the first spacing and the second spacing are in accordance with an initial two consecutive terms of a Fourier series expansion representing a sawtooth wave.

3. The method according to claim 2, further comprising calculating a spacing from the first reflector for four or more additional reflectors, wherein the spacing from the first reflector for four or more additional reflectors is in accordance with one or more terms in the Fourier series expansion that follow the initial two consecutive terms.

4. The method according to claim 1, wherein calculating a second spacing comprises:
   performing a Monte Carlo simulation that comprises varying the second spacing and varying a reflectivity of at least one of the first, second and third reflectors;
   performing a sum of the squares of differences between the sawtooth wave approximation and the sawtooth wave to provide a measure of fit; and
   iterating the performing a Monte Carlo simulation and performing a sum of the squares until the measure of fit meets or exceeds a threshold value.

5. The method according to claim 1, where in the first spacing equals L and the second spacing equals 2L or the first spacing equals L and the second spacing equals 3L.

6. The method according to claim 1, wherein a total reflectance of all the reflectors is greater than the total reflectance due to Rayleigh scattering.

7. The method according to claim 1, wherein a number of reflectors in each sensing unit is ten or fewer.

8. The method according to claim 1, wherein a distance between a reflector in a first sensing unit and an adjacent reflector in a second sensing unit that is adjacent to the first sensing unit is greater than a length of a pulse of light illuminating the optical fiber.

* * * * *